United States Patent [19]
Yamashita

[11] Patent Number: 5,601,742
[45] Date of Patent: Feb. 11, 1997

[54] HEATING DEVICE FOR AN INTERNAL COMBUSTION ENGINE WITH PTC ELEMENTS HAVING DIFFERENT CURIE TEMPERATURES

[75] Inventor: Takahisa Yamashita, Suntoh-gun, Japan

[73] Assignee: Texas Instruments Incorporated, Dallas, Tex.

[21] Appl. No.: 294,298

[22] Filed: Aug. 23, 1994

[30] Foreign Application Priority Data

Sep. 3, 1993 [JP] Japan ..................... 5-243672

[51] Int. Cl.$^6$ ........................................... B60L 1/02
[52] U.S. Cl. ..................... 219/207; 219/504; 123/549; 261/142
[58] Field of Search .................. 219/205–208, 219/504–505; 123/549; 261/142, DIG. 20

[56] References Cited

U.S. PATENT DOCUMENTS

| | | | |
|---|---|---|---|
| 3,400,252 | 9/1968 | Hayakawa et al. | 219/504 |
| 4,045,763 | 8/1977 | Miyamoto et al. | 219/504 |
| 4,086,467 | 4/1978 | Grant | 219/544 |
| 4,395,994 | 8/1983 | Goto et al. | 123/549 |
| 4,482,801 | 11/1984 | Habata et al. | 219/505 |
| 4,544,829 | 10/1985 | Adachi et al. | 219/505 |
| 4,556,781 | 12/1985 | Bauer | 219/270 |
| 4,721,848 | 1/1988 | Malone et al. | 219/504 |
| 4,835,370 | 5/1989 | Van Bokestal et al. | 219/504 |
| 4,841,127 | 6/1989 | Prager et al. | 219/505 |
| 5,039,839 | 8/1991 | Masaka et al. | 219/270 |
| 5,206,483 | 4/1993 | Aota | 219/270 |
| 5,275,146 | 1/1994 | Yamashita | 123/549 |
| 5,428,206 | 6/1995 | Uchida et al. | 219/504 |

FOREIGN PATENT DOCUMENTS

| | | |
|---|---|---|
| 4040258 | 7/1992 | Germany . |
| 61-217647 | 9/1986 | Japan . |
| 4-236401 | 8/1992 | Japan . |

OTHER PUBLICATIONS

Patent Abstracts of Japan, vol. 17, No. 59 (M–1363) 5 Feb. 1993 & JP–A–04 268 112 (Jidosha Kiki Co Ltd) 24 Sep. 1992.

Patent Abstracts of Japan, vol. 16, No. 380 (M–1295) 14 Aug. 1992 & JP–A–04 124 467 (Kyocara Corp.) 25 Apr. 1992.

Primary Examiner—Teresa J. Walberg
Assistant Examiner—Raphael Valencia
Attorney, Agent, or Firm—Russell E. Baumann; Richard L. Donaldson; René E. Grossman

[57] ABSTRACT

A heating device for heating an item such as a carburetor uses a first PTC heating element 12 positioned compactly within a housing 10 which is directly adjacent the item to be heated. A Second PTC element 14 having a great electrical resistance increase at a prescribed temperature level is also compactly contained in the housing and is electrically connected in series to the first PTC element 12. This second PTC element 14 restricts the electric current flow through the device when the ambient temperature exceeds the prescribed temperature level.

7 Claims, 7 Drawing Sheets

HEATING DEVICE FOR AN INTERNAL COMBUSTION ENGINE WITH PTC ELEMENTS HAVING DIFFERENT CURIE TEMPERATURES

FIELD OF THE INVENTION

This invention relates to a heating device; and more particularly, to a heating device which is suitable for use in an internal combustion engine.

BACKGROUND OF THE INVENTION

In a carburetor used in the internal combustion engine of a motorcycle or an automobile, there is typically provided a heating device for enhancing the atomization of the fuel and the mixing thereof with air in a regular fashion in a cold starting situation. Generally, the heating device is installed adjacent the throttle valve of the carburetor, and is operational at an ambient temperature lower than a prescribed temperature. Under these conditions, the resistance heater is made electrically conductive and the carburetor is warmed by the resistance heating, thereby melting or preventing the icing inside the carburetor. A PTC (Positive Temperature Coefficient) element has mostly been used as the resistance heater element for these devices.

The PTC element has such characteristics that, at the time when the temperature reaches a prescribed predetermined level, there is a sudden increase in the resistance value of the element. This increase in resistance will restrict the electric current passing through the PTC heater; and accordingly, automatically restrict the heating provided by the PTC element. If the PTC element continues to be electrically conductive, however, the electric power is not only wasted but there also develops a danger that the fuel will be overheated as the heat is accumulated inside the carburetor. Because of this, it is ordinarily the case that the electrical flow through the element is terminated at the time when the temperature of the carburetor has reached a suitable value.

In the heating device, according to the prior art, a bimetal type thermostat is electrically connected in series with the PTC heating element to disconnect it from the electrical source at the time when the ambient temperature (carburetor or atmospheric temperature) happens to be higher than a prescribed level. That is, the bimetal of the thermostat snaps to an open position, thereby terminating the electrical current to the PTC element.

The heating device coupled with a bimetal type thermostat, as described above according to prior art, has had restrictions in terms of the freedom of the package design, durability and reliability, switching characteristics and temperature control characteristics, etc. Irrespective of whether the bimetal type thermostat is accommodated in a separate package or in the same package with the resistance heating element, the shape and size of the bimetal has served as a bottleneck for the free design of a compact package.

Further, at the time when ambient temperature is extremely low, the item heated (carburetor) tends to be cool, with a result that the current is passed to the resistance heater on an intermittent basis. This means in the case of a bimetal type thermostat that the mechanical contacts open and close frequently, with a consequence that there is excessive contact wear and, thus, greater possibility for contact welding.

Yet further, there is a substantial hysteresis between the action or set temperature at the time when the bimetal snaps from the original position (ON position) to the responding position (OFF position); and the action temperature at the time when the bimetal returns from the responding position resulting in the fact that it has not been possible to effect the ON/OFF of electric conductivity at the same action temperature. Still further, it has been difficult to match the temperature and electric current characteristics of the bimetal with those of the PTC resistance heater; and thus, it has not been possible to freely select the temperature control characteristics of the heating device as desired.

SUMMARY OF THE INVENTION

Accordingly, it is an object of this invention to provide an improved heating device with compact package design, durability and reliability in operation and improved switching characteristics and temperature control characteristics.

More specifically, a heating device of this invention for heating a specified item by using electrical current comprises a resistance heating means for heating the specified item, and a PTC element having a great electrical resistance increase at a prescribed temperature level which is electrically connected in series with said resistance heater means, said PTC element restricting the electric current flow in the device at the time when the ambient temperature exceeds said prescribed temperature level.

In accordance with another embodiment of this invention, a heating device for heating a specified item by using electrical current comprises at least one first PTC element for heating the specified item, and a second PTC element having a great electrical resistance increase at a prescribed temperature level which is electrically connected in series with said at least one first PTC element, said second PTC element restricting the electric current flow in the device at the time when the ambient temperature has exceeded said prescribed temperature level.

In accordance with yet another embodiment of this invention, a heating device for heating a specified item comprises a first PTC element for heating the specified item, a second PTC element having a great electrical resistance increase at a prescribed temperature level which is electrically connected in series with said first PTC element, said second PTC element restricting the electric current to said first PTC element at the time when the ambient temperature has exceeded said prescribed temperature, and a main body which houses said first and second PTC elements in a compact cost effective manner.

DESCRIPTION OF THE DRAWINGS

Other objects, advantages, features and details of the novel and improved heating device of this invention appear in the following detailed description of preferred embodiments of the invention, the detailed description referring to the drawings in which.

DESCRIPTION OF THE PREFERRED EMBODIMENTS

Figure 1:
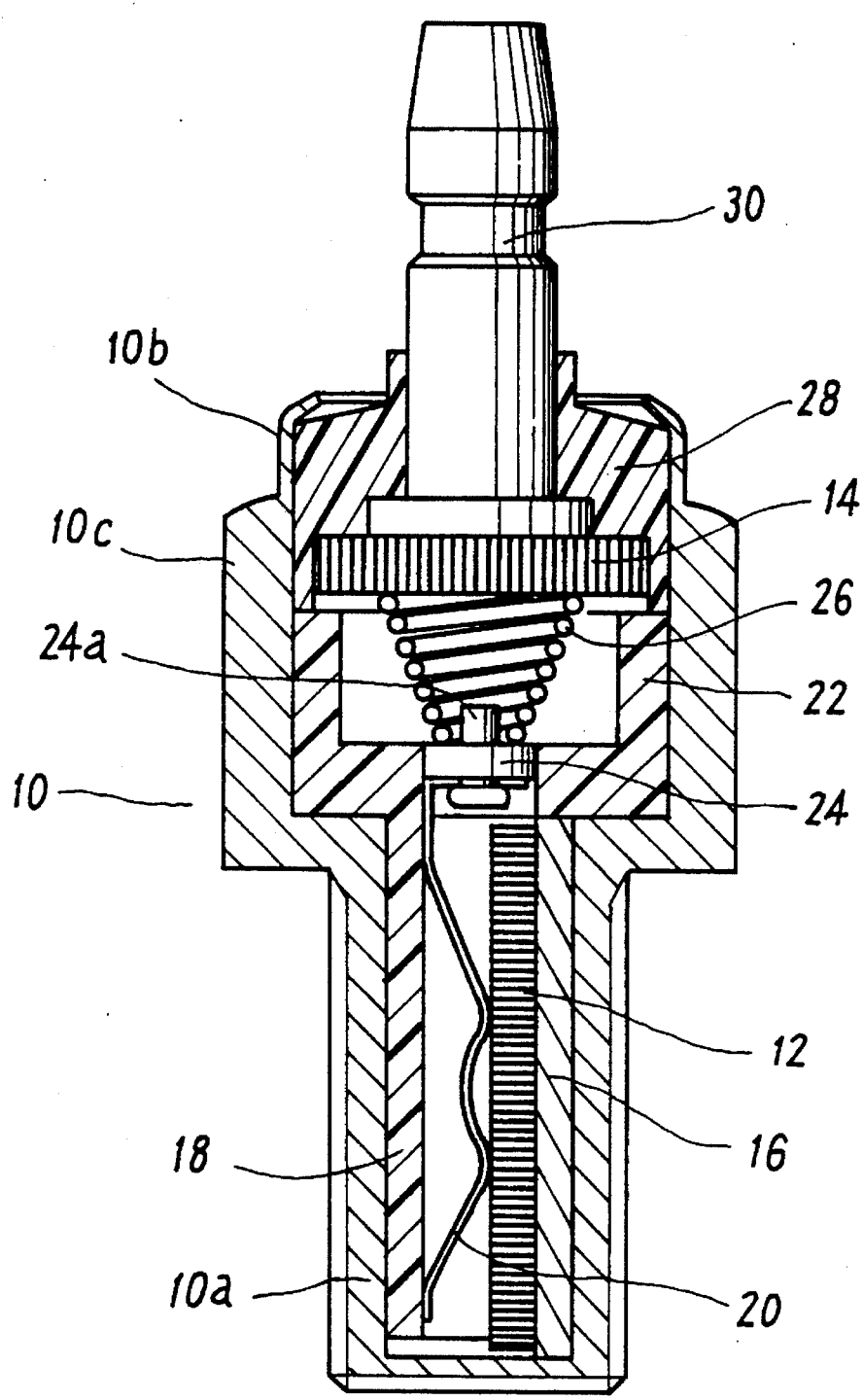
FIG. 1 is a longitudinal sectional view of a heating device of a first embodiment of the present invention.
Figure 2:
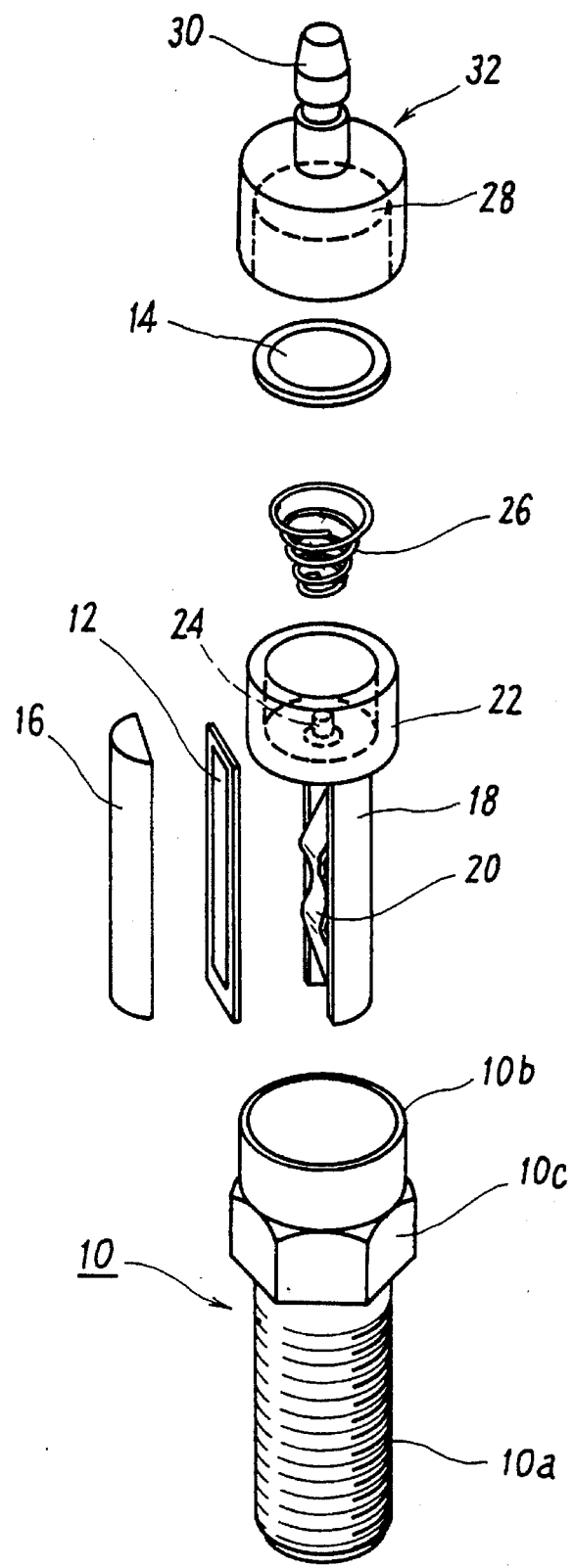
FIG. 2 is a disassembled oblique view of the heating device of FIG. 1.

FIGS. 1 and 2 show the construction of a heating device of a first embodiment of the present invention.

Accordingly, the heating device has a main body 10 used as a heat sink member in the shape of a cylinder having a closed bottom portion made of an electrically and thermally conductive material such as brass with a central cavity therein to accommodate preferably a PTC heating element 12 for heating an item to be heated such as a carburetor and a PTC element 14 electrically connected in series with PTC element 12. The PTC element 14 acts to substantially shut off or restrict the electric current being delivered to the heating PTC element 12 at the time when the ambient temperature adjacent it has exceeded a prescribed temperature level. This ambient temperature typically reflects the temperature of the item to be heated and/or the atmospheric temperature.

Main body 10 has a small-diameter part 10a at the bottom portion of the body and a large diameter part 10b at the open end portion of the body with a male screw thread being formed on the outer peripheral surface of the small-diameter part 10a and a collar 10c in the shape of a regular polygon (such as a hexagon) on the outer detachable surface of the large-diameter part 10c.

The heating element 12 is preferably a PTC element of a generally rectangular shape typically having barium titanate as a main constituent. Two opposite board contact surfaces are coated with a film of a high electrically conductive material such as silver for providing a satisfactory electrical contact for the element. This heating PTC element 12 is housed inside small diameter part 10a of main body 10. Heating PTC element 12 is compressively held between a semi-columnar thermally and electroconductive support member 16 having an outer peripheral surface corresponding to the inner peripheral surface of the small diameter part 10a of main body 10 and an electricity supplying contact spring member 20 made from an electroconductive material such as stainless steel or the like contained inside a semi-cylindrical insulating member 18 having an outer peripheral surface that corresponds to the inner peripheral surface of the small diameter part 10a of the main body 10. This provides for a very compact design, and ensures good electrical and thermal conductivity between body 10 and heating element 12.

At the top of the semi-cylindrical insulating member 18, an insulating cylindrical member 22 is provided with a bottom and an open top having an outer peripheral surface that corresponds to the inner peripheral surface of the large diameter part 10c of the main body 10. A circular opening is provided within the bottom insulating member 22 for receiving a disc-shaped stationary contact 24 made of an electroconductive material such as brass.

At the bottom surface of this contact 24 (the side closest to the closed end of housing 10), there is affixed an end base of electricity supplying contact spring 20. A protuberant 24a is provided on the upper surface of the contact 24 (the side closest to the open end of housing 10) around which the lower end of an electricity supplying contact spring 26 of the conical coil type is positioned. This spring 26 is made from an electroconductive material such as beryllium copper or the like.

PTC element 14 is placed on the top of the electricity supplying contact spring 26 near the top of the open end of housing 10. A cap-shaped member 28 of insulating material is provided to receive an electrical terminal 30 for forming an assembly 32 which along with insulating member 22 positions PTC element 14, and assures reliable electrical contact is made among terminal 30, PTC element 14 and contact spring 26. A wall portion 10b of body 10 is crimped around member 28 to hold all components of the heating device in place.

PTC element 14 is typically a disc shaped PTC element of a barium titanate material with its main contact surfaces coated with a thin layer of a high electric conductivity material such as silver for providing ohmic surfaces for the element.

The heating device is designed to be mounted freely detachably in the item to be heated such as a carburetor by screwing the male screw threads of the small diameter part 10a of the main body 10 onto corresponding female screw threads (not shown in the drawing) on the inside of the item to be heated. For installation or dismantling the heater, a wrench is applied to a collar 10c to rotate it in a required direction. When installed, the small diameter part 10a of the main body 10 is screwed into the item to be heated with the large diameter part 10c extending outside therefrom.

In the heating device of the present invention, main body 10 that is connected to the item to be heated is the ground for the device and a prescribed voltage source connected to terminal 30 is the current source. This along with the compact positioning of components used therein provides for a compact design. As the source of voltage is activated, the electric current flows from the terminal 30 through the current restricting PTC element 14, through the conical coil type electricity supplying contact spring 26, through the stationary contact 24, through the plate spring type electricity supplying contact spring 20 and through the heating PTC element 12 to the semi-columnar electroconductive member 16 and body 10. The current value of this electric current changes in conformity with the change in the resistance values of both PTC elements 12 and 14.

Figure 3:
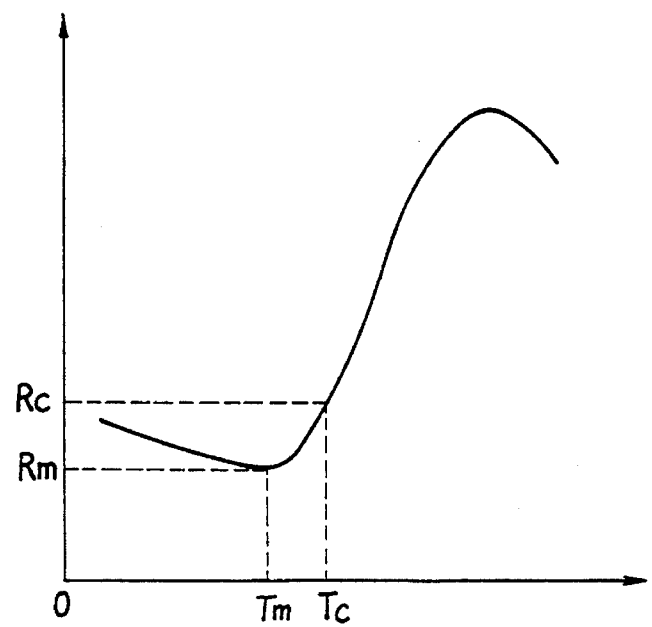
FIG. 3 is a curve showing the resistance temperature characteristics of a PTC element.

FIG. 3 shows the resistance temperature characteristics of a PTC element. The resistance value of the PTC element comes down at first as the temperature rises, registering a minimum value or the smallest value Rm at a certain temperature Tm. As it passes this minimum point Tm, it then rises and becomes sharply higher in the neighborhood of the Curie point Tc with resistance value Rc.

In this embodiment, the resistance value of the heating PTC element 12 is selected to be relatively much higher than the resistance value of PTC element 14 (i.e., approximately four to five times higher or more). Also, the Curie point of the PTC heating element 12 is selected to be higher than that of PTC element 14. The Curie point for heating element 12, for example, is selected in the neighborhood of 200° C. and the Curie point of the PTC element 14 for current restriction is selected in the neighborhood of 25° C.

Figure 4:
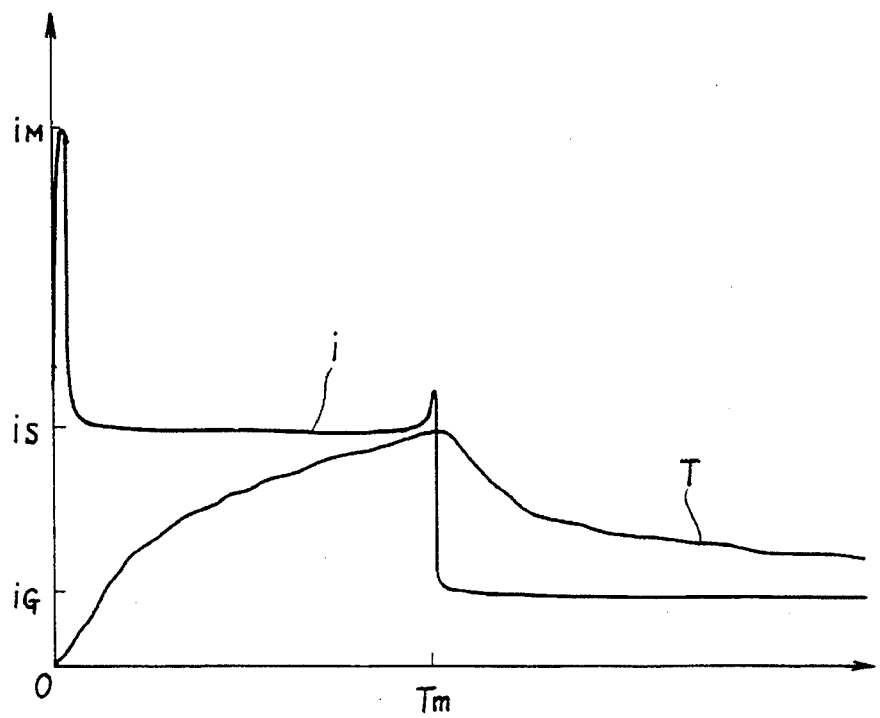
FIG. 4 is a graph of the electric current characteristics and the temperature control characteristics of the heating device of the first embodiment.

FIG. 4 shows an example of an electric current control characteristic and temperature control characteristic for a heating device of this invention. When the electric source is activated, initial current with a high value (im) immediately starts to flow after the start of the electric conductivity. After this initial high current level, the resistance values become stabilized and the electric current (is) settles down to approximately a constant value. The amount of heat to the item to be heated by Joule's heat is determined by the electric current value and the resistance value of the element 12, with a result that the temperature of the item to be heated gradually rises.

An electric current level which is the same as for the heating PTC element 12 flows to the PTC element 14. Since the resistance value of the element 14 is low, its Joule's heat is minimal to the item to be heated. When the temperature of the item to be heated rises to a certain value Tm (such as 26.0 degrees centigrade), the ambient temperature of the PTC element 14 for restricting the electric current passes its Curie point Tc, with a consequence that the resistance value of the element 14 is increased and the electric current i rapidly decreases to a small current value (ig). Correspondingly, the heating by the resistance heating of the heating PTC element 12 stops substantially, and the temperature T of the subject to be heated comes down gradually.

When the temperature of the subject to be heated is lowered sufficiently and the ambient temperature of the PTC element 14 returns to the original stable value the PTC element 14 for restricting the electric current once again has a relatively low resistance with a higher current passing through it; and the heating by the resistance heating of the heating PTC element 12 starts once again.

As has been described above, the resistance heating element used for heating the item to be heated is preferably a PTC element as well as the element for restricting the electric current that is supplied to element 12. Different from a bimetal actuated device, the PTC element 14 is a contact-less switch with a result that even if the ON/OFF of electric conduction is repeated many times, there is no danger of a contact failure, etc., and a stable and accurate switching is guaranteed.

Figure 5:
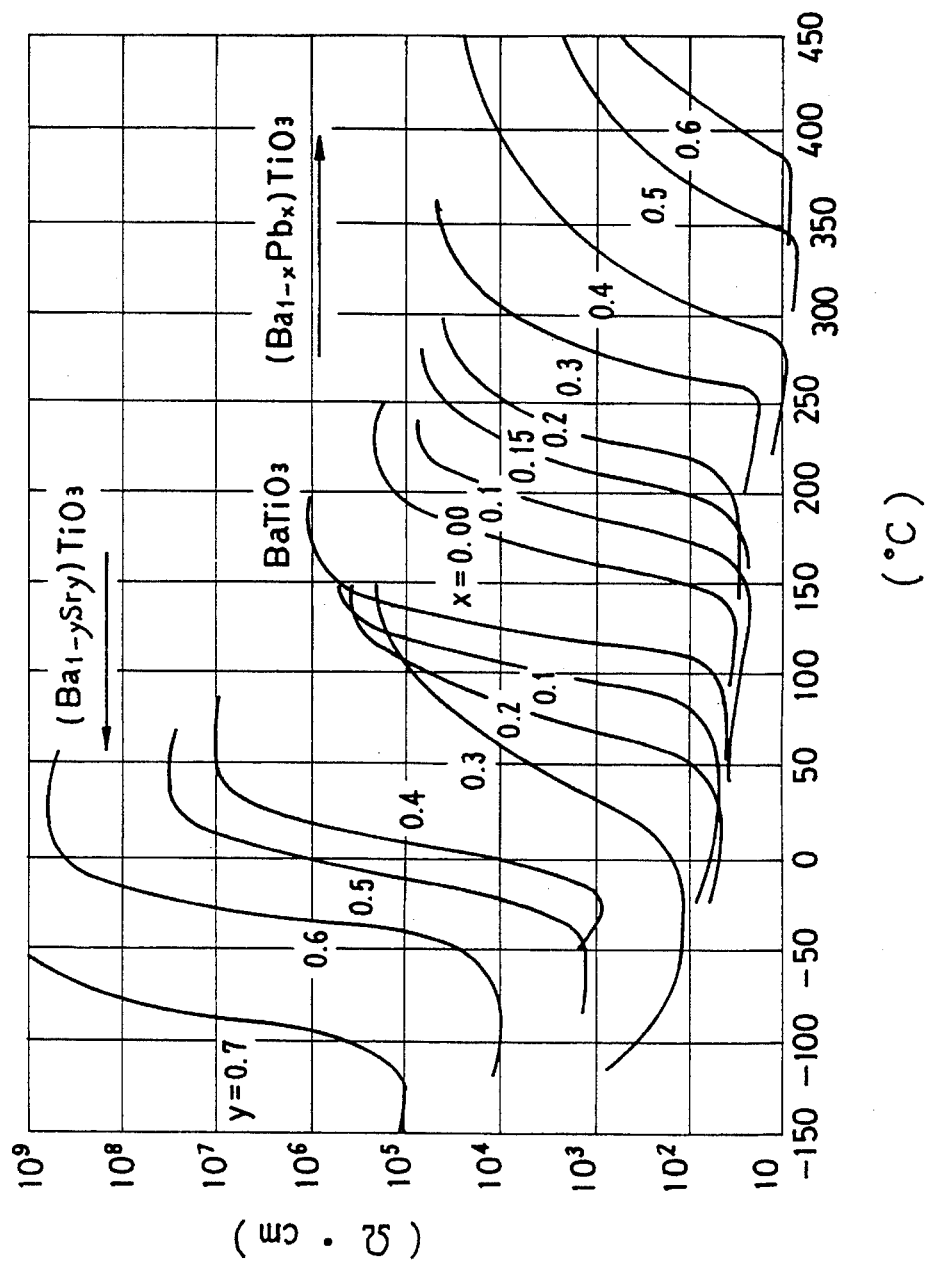
FIG. 5 shows curves of the resistance temperature characteristics for PTC elements with different amounts of additives.

In addition, the "switching point" of the PTC element 14 may be set at any point in a wide range as shown in FIG. 5 by selecting the kind of constituents (such as, for instance, Sr and Pb) and the amount of their addition to the barium titanate (BaTiO3) which is the main ingredient of the PTC element. Moreover, it is easily possible to match the temperature elevation and electric current characteristics of the PTC element 14 with those of the heating PTC element 12.

Further, in this embodiment the PTC element 14 has been formed as a disc-shaped platy piece so as to be compactly incorporated vertically into the large diameter part 10c of the main body 10 between terminal 30 and the electricity supplying contact spring 26. This structure leads to a device with reduced, compact size including both elements 12 and 14 in a single body that can be installed in a small carburetor such as for a motorcycle.

In this embodiment, the PTC element 14 is arranged on the contact spring 26. However, the positional relationship of these two can be reversed. In such a case, the heat from the heating PTC 12 more quickly effects PTC element 14 for restricting the electric current; and thus, the time required to respond to the higher ambient temperature.

Figure 6:
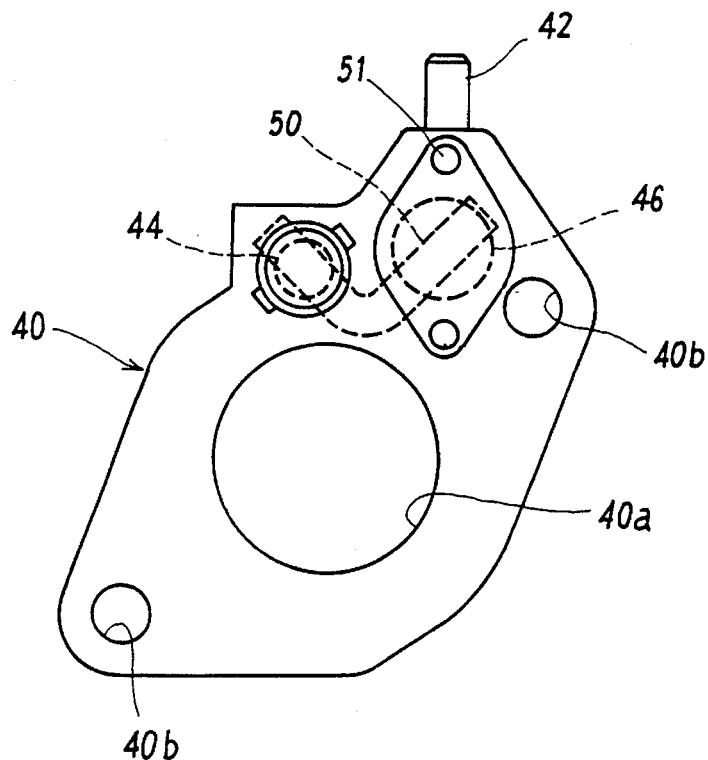
FIG. 6 is a plane view of a heating device of a second embodiment of the present invention.
Figure 7:
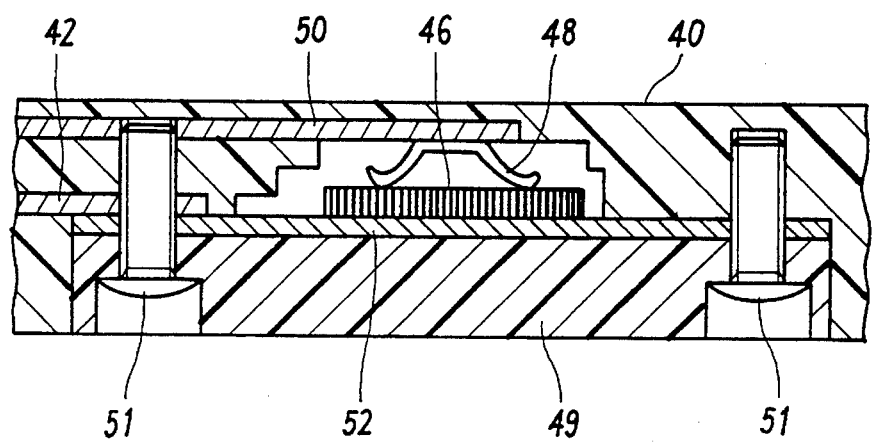
FIG. 7 is a partial cross-section view of FIG. 6 showing the PTC element for restricting the electric current.
Figure 8:
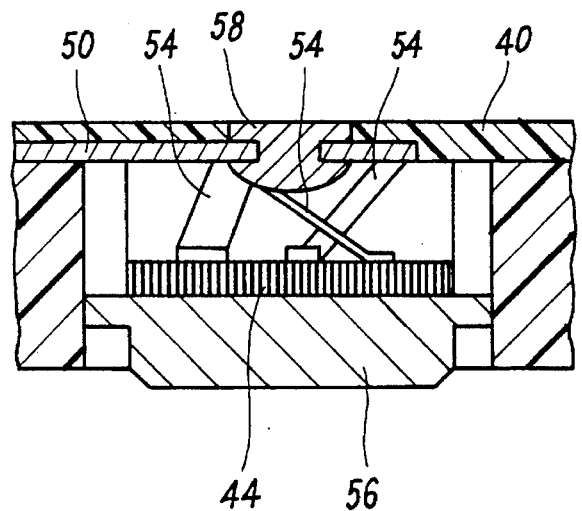
FIG. 8 is a partial cross-section view of FIG. 6 showing the heating PTC element.

FIGS. 6 through 8 show the structure of the heating device in a second embodiment of this invention. FIG. 6 shows a plane figure of this heating device, FIG. 7 shows a cross-section of the PTC element for restricting the electric current in this heating device and FIG. 8 is a cross-section showing the structure of the heating PTC element in this heating device.

The heating device shown in FIG. 6 can be inserted and installed between the carburetor and the intake manifold for the purpose of heating the carburetor of an automobile or the like. The main body 40 is made of a thick insulating plate in which an opening 40a is provided at its center for allowing the flow of fuel, and openings 40b are provided for installing the device. On the surface of one side of the main body 40, an external connecting terminal 42 is mounted; and in close proximity to this terminal 42, a heating PTC element 44 and a PTC element 46 for restricting the electric current are housed in the main body 40.

As shown in FIG. 7, PTC element 46 for restricting the electric current is held and secured by a contact spring 48 between a top terminal plate 50 and a second bottom terminal plate 52, both plates being made from an electrically conductive material such as stainless steel. First terminal plate is in contact with the inner surface of main body 40 and second terminal plate is in contact with the inner surface of a cover 49.

The electricity supplying first terminal plate 50 extends to also to contact heating PTC element 44 so that the elements are in series with each other. Cover 49 is installed on the main body 40 by means of bolt member 51.

As shown in FIG. 8, the heating PTC element 44 is held and secured through a contact spring 54 between electricity supplying terminal plate 50, and a heat sink plate 56 made of an electroconductive material such as brass. Contact spring 54 is installed on main body 40 by means of a rivet 58.

In this heating device, the heat sink plate 56 is connected to electrical ground through a carburetor or an intake manifold (which is not shown in the drawing), and the source voltage is impressed to the external connection terminal 42. The electric current flows to ground through external connection terminal 42, electricity supplying terminal plate 52, PTC element 46, contact spring 48, terminal plate 50, contact spring 54, heating PTC element 44 and the heat discharge plate 56.

The Joule's heat due to the resistance heating of PTC element 44 is transmitted to the carburetor or intake-manifold through the heat discharge plate 56. The PTC element for restricting the electric current senses the temperature of the carburetor/intake-manifold and/or the atmosphere, and effects the switching of electric conductance ON/OFF at the predetermined set point in response to the temperature.

As in the case of the heating device described in the first embodiment, the heating device in this embodiment example is also capable of greatly improving the durability, reliability, switching characteristics and the temperature control characteristics as well as reducing the size of the device.

Figure 9:
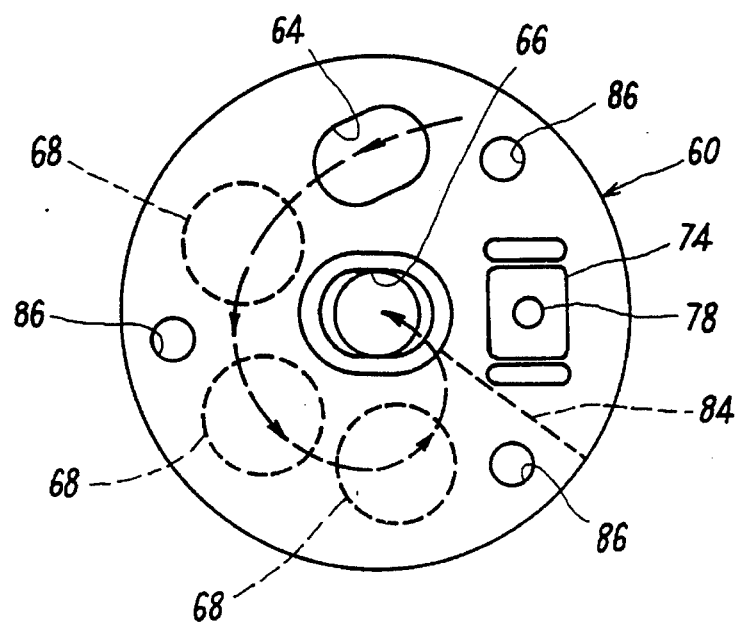
FIG. 9 is a plane view of a heating device of a third embodiment of the present invention.
Figure 10:
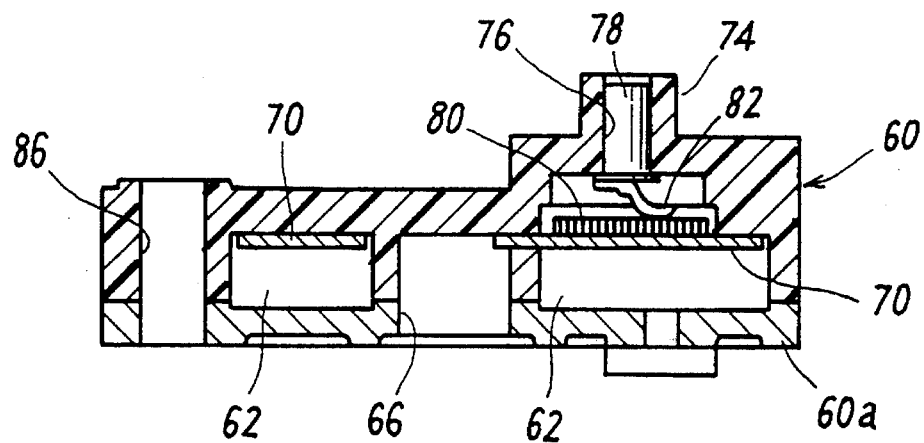
FIG. 10 is a partial cross-section view of FIG. 9 showing the PTC element for restricting the electric current.
Figure 11:
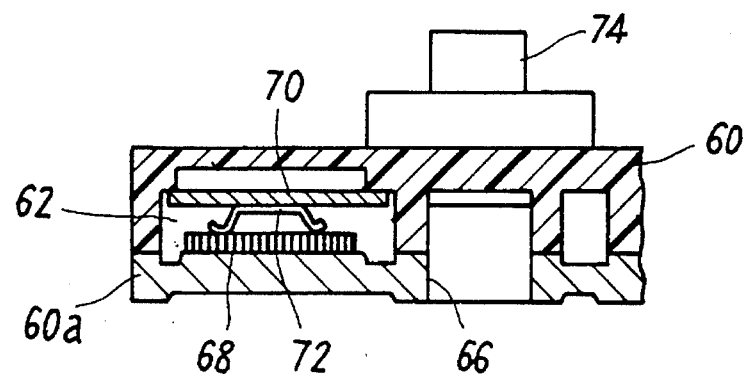
FIG. 11 is a partial cross-sectional view of FIG. 9 showing the heating PTC element.

FIGS. 9 through 11 show the structure of the heating device of a third embodiment of this invention. FIG. 9 is a plane figure of this heating device, FIG. 10 is a cross-section showing the arrangement of the PTC element for restricting the electric current, and FIG. 11 is a cross-section showing the arrangement of the heating PTC element in this device.

This heating device is of the type typically installed on top of a diesel fuel filter for the purpose of heating the diesel fuel entering this filter. A main body 60 is a disc-shaped body made of an insulating material with a fuel passageway 62 provided therein. A heat sink plate 60a made of a heat conducting material forms a bottom wall of fuel passage 62. A fuel introduction hole 64 is provided on the periphery of the upper surface of the main body 60 and a fuel exit hole 66 is provided at the center.

As is shown in FIGS. 9 and 11, a plurality of PTC heating elements 68 are arranged at a suitable interval in the circumferential direction around the fuel passageway 62. A frame member 70 made of a metal is adhered to the ceiling of the fuel passageway 62 opposite heat sink plate 60a and each heating PTC element 68 is held and secured through a contact spring 72 between this frame member 70 and the heat sink plate 60a.

As is shown in FIG. 10, a tower part 74 is provided at the top of the main body 60 and a cylindrically shaped external connection terminal 78 is inserted into and fixed in a hole 76 of this tower part 74. The frame member 70 extends to the interior of the tower part 74 and a PTC element 80 for restricting the electric current is held and fixed through a contact spring 82 between this frame member 70 and the lower surface of the external connection terminal 78.

Further, in FIG. 9 there is provided a guide plate 84 for directing the passage of the fuel to the exit hole 66 inside the main body 60 in close proximity to the tower part 74. In addition, a plurality of installation holes 86 are provided on the peripheral part of the main body 60.

In this heating device, heat discharge plate 60a is connected to the ground through a main filter body (which is not shown in the drawing), and a source voltage is impressed to the external connection terminal 78. The electric current flows to ground through terminal 78, contact spring 82, PTC element 80, frame member 70, contact spring 72, heating PTC element 68 and heat discharge plate 60a.

The fuel that is introduced to the fuel opening 64 is heated as it contacts the various heating PTC elements 68 while flowing along the fuel passageway 62 and is exited at the filter side from the fuel outlet 66. The PTC element 80 for restricting the electric current senses the temperature of the fuel and the temperature of the outside atmosphere so as to control the ON/OFF switching at the predetermined, prescribed set point in response to the temperature.

Like the heating devices in the aforementioned first and second embodiments, the heating device in this embodiment is capable of greatly improving the durability, reliability, switching characteristics and the temperature control characteristics of the device as well as effecting a reduction of its size.

According to the heating devices of this invention which have been explained above, the freedom surrounding the package design, the durability and reliability, the switching characteristics and the temperature control characteristics can be greatly improved by the use of a PTC element to control the current flow value; and thus, heat generated by a separate resistance heater.

It should be understood that although particular embodiments of this invention have been described by way of illustrating the invention, this invention includes all modification and equivalents of the disclosed embodiments falling within the scope of the expanded claims. For example, a PTC element has been used as the resistance heater for heating the item to be heated. However, it would be possible to use another resistance heater such as Nichrome wire heater. In addition, the heating device of this invention can be used not only in conjunction with an automobile part like the carburetor or diesel filter, but also in various other machines and devices.

I claim:

1. A heating device for heating an item by using electrical current comprising at least one first PTC element for heating, a second PTC element having a great electrical resistance increase at a prescribed Curie temperature level which is electrically connected in series with said at least one first PTC element, said at least one first PTC element having a much higher Curie temperature then said second PTC element said second PTC element restricting the electrical current flow in the device at a time when an ambient temperature for the device exceeds said prescribed Curie temperature level and a main body for the device which compactly houses said first and second PTC elements said main body being an electrically and thermally conductive heatsink for the device in electrical series connection with said first and second PTC elements.

2. A heating device of claim 1 wherein said at least one first PTC element has a Curie temperature of about 200° C. and said second PTC element has a Curie temperature of about 25° C.

3. A heating device of claim 1 wherein said at least one first PTC element has a much higher resistance value than said second PTC element.

4. A heating device of claim 1 wherein said at least one first PTC element's resistance value is at least about 4 times greater than the resistance value of said second PTC element.

5. A heating device of claim 1 wherein said main body heat sink has a generally hollow cylindrical configuration being closed at one end and open at the other, said at least one first PTC element being contained adjacent the closed end of the main body heat sink and said second PTC element being contained adjacent the open end.

6. A heating device of claim 5 wherein said at least one first PTC element is contained in said main body heat sink in one of a horizontal and vertical position and the second PTC is contained in said main body heat sink in the other position for providing a compact design.

7. A heating device of claim 5 further including a semi-columnar thermally and electrically conductive support member having one major outer surface received in close contact by said main body heat sink and another major outer surface in close contact with said at least one first PTC element for providing a compact design and good thermal transfer.

* * * * *